(12) United States Patent
Koontz et al.

(10) Patent No.: US 9,742,142 B1
(45) Date of Patent: Aug. 22, 2017

(54) HEAT EXCHANGERS WITH TAPERED LIGHT SCRAPERS FOR HIGH-POWER LASER SYSTEMS AND OTHER SYSTEMS

(71) Applicant: RAYTHEON COMPANY, Waltham, MA (US)

(72) Inventors: Christopher R. Koontz, Manhattan Beach, CA (US); Reynaldo Cabrera, Torrance, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/146,747

(22) Filed: May 4, 2016

(51) Int. Cl.
*H01S 3/04* (2006.01)
(52) U.S. Cl.
CPC .............. *H01S 3/04* (2013.01); *H01S 3/0405* (2013.01); *H01S 3/0407* (2013.01)
(58) Field of Classification Search
CPC ........... H01S 3/005; H01S 3/04; H01S 3/0407
USPC .............................................. 359/333; 372/35
See application file for complete search history.

(56) References Cited

U.S. PATENT DOCUMENTS

| | | | |
|---|---|---|---|
| 4,271,396 A * | 6/1981 | Brown ........................ | H01S 3/02 372/35 |
| 4,511,216 A * | 4/1985 | Hsu .......................... | H01S 3/005 359/864 |
| 5,745,293 A | 4/1998 | Lassalle | |
| 6,301,277 B1 | 10/2001 | Tinti et al. | |
| 6,421,364 B2 | 7/2002 | Lubrano | |
| 6,480,515 B1 * | 11/2002 | Wilson .................... | H01S 5/024 372/35 |
| 7,133,177 B2 | 11/2006 | Tamaru | |
| 7,245,409 B2 | 7/2007 | Tamaru | |
| 7,293,886 B2 | 11/2007 | Holmgren et al. | |
| 7,903,351 B2 * | 3/2011 | Clar .................... | G03F 7/70025 359/811 |
| 9,202,488 B2 | 12/2015 | Peng et al. | |
| 2004/0233960 A1 | 11/2004 | Vetrovec | |
| 2004/0258123 A1 | 12/2004 | Zamel et al. | |

(Continued)

FOREIGN PATENT DOCUMENTS

| | | |
|---|---|---|
| EP | 1003252 A2 | 5/2000 |
| EP | 1480299 A1 | 11/2004 |
| EP | 1492207 A2 | 12/2004 |

OTHER PUBLICATIONS

Notification of Transmittal of the International Search Report and the Written Opinion of the International Searching Authority, or the Declaration dated May 29, 2017 in connection with International Patent Application No. PCT/US2017/015997.

*Primary Examiner* — Mark Hellner (57) ABSTRACT

An apparatus includes a heat exchanger with a body having a passage through the body. The passage defines apertures on multiple sides of the body, and the passage is configured to allow optical signals to pass through the body. One or more tapered edges are at least partially around one or more of the apertures, and each tapered edge is configured to reflect optical radiation inward into the passage. One or more absorptive surfaces are within the passage, and the one or more absorptive surfaces configured to absorb the reflected optical radiation. The heat exchanger is configured to convert the absorbed optical radiation into heat, and the body further includes one or more cooling channels configured to receive coolant that absorbs the heat.

26 Claims, 9 Drawing Sheets

(56) References Cited

U.S. PATENT DOCUMENTS

2005/0058173 A1* 3/2005 Vetrovec ............... H01S 3/025
 372/66
2012/0026749 A1 2/2012 Armstrong

* cited by examiner

HEAT EXCHANGERS WITH TAPERED LIGHT SCRAPERS FOR HIGH-POWER LASER SYSTEMS AND OTHER SYSTEMS

TECHNICAL FIELD

This disclosure is generally directed to laser systems. More specifically, this disclosure is directed to heat exchangers with tapered light scrapers for high-power laser systems and other systems.

BACKGROUND

High-power laser systems are being developed for a number of military and commercial applications. In some laser systems, a master oscillator/power amplifier (MOPA) configuration is used. The master oscillator generates a low-power optical signal that is then amplified by a power amplifier to generate a high-power output beam.

Unfortunately, stray electro-optical radiation is typically present to some extent in laser systems, such as due to fluorescence or amplified spontaneous emissions (ASE). The stray radiation denotes optical energy that does not follow a desired path in the laser systems. This stray radiation can strike other components in the laser systems and can be absorbed by those components. This creates heat in the other components, which can cause significant problems in the laser systems. For example, the heating of optical device mounts can cause the mounts to bend or warp, creating pointing errors. The heating of housings, mounts, fasteners, and adhesives can also lead to material failures in those components. The heating of various component surfaces can further lead to off-gassing or out-gassing from the surfaces of components.

SUMMARY

This disclosure provides heat exchangers with tapered light scrapers for high-power laser systems and other systems.

In a first embodiment, an apparatus includes a heat exchanger with a body having a passage through the body. The passage defines apertures on multiple sides of the body, and the passage is configured to allow optical signals to pass through the body. One or more tapered edges are at least partially around one or more of the apertures, and each tapered edge is configured to reflect optical radiation inward into the passage. One or more absorptive surfaces are within the passage, and the one or more absorptive surfaces are configured to absorb the reflected optical radiation. The heat exchanger is configured to convert the absorbed optical radiation into heat, and the body further includes one or more cooling channels configured to receive coolant that absorbs the heat.

In a second embodiment, a system includes a laser gain medium configured to amplify optical signals and a heat exchanger. The heat exchanger includes a body having a passage through the body. The passage defines apertures on multiple sides of the body, and the passage is configured to allow the amplified optical signals to pass through the body. The heat exchanger also includes one or more tapered edges at least partially around one or more of the apertures, where each tapered edge is configured to reflect optical radiation inward into the passage. The heat exchanger further includes one or more absorptive surfaces within the passage, where the one or more absorptive surfaces are configured to absorb the reflected optical radiation. The heat exchanger is configured to convert the absorbed optical radiation into heat, and the body further includes one or more cooling channels configured to receive coolant that absorbs the heat.

In a third embodiment, a method includes passing optical signals into a passage through a body of a heat exchanger, where the passage defines apertures on multiple sides of the body. The method also includes reflecting optical radiation inward into the passage using one or more tapered edges at least partially around one or more of the apertures. The method further includes absorbing the reflected optical radiation using one or more absorptive surfaces within the passage. In addition, the method includes converting the absorbed optical radiation into heat and transferring the heat to coolant within one or more cooling channels of the heat exchanger.

In a fourth embodiment, a method includes obtaining a laser gain medium configured to output optical signals and inserting a heat exchanger into an optical path of the optical signals. The heat exchanger includes a body having a passage through the body, where the passage defines apertures on multiple sides of the body. The passage is configured to allow the optical signals to pass through the body. The heat exchanger also includes one or more tapered edges at least partially around one or more of the apertures, where each tapered edge is configured to reflect optical radiation inward into the passage. The heat exchanger further includes one or more absorptive surfaces within the passage, where the one or more absorptive surfaces are configured to absorb the reflected optical radiation. The heat exchanger is configured to convert the absorbed optical radiation into heat, and the body further includes one or more cooling channels configured to receive coolant that absorbs the heat.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 7B, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
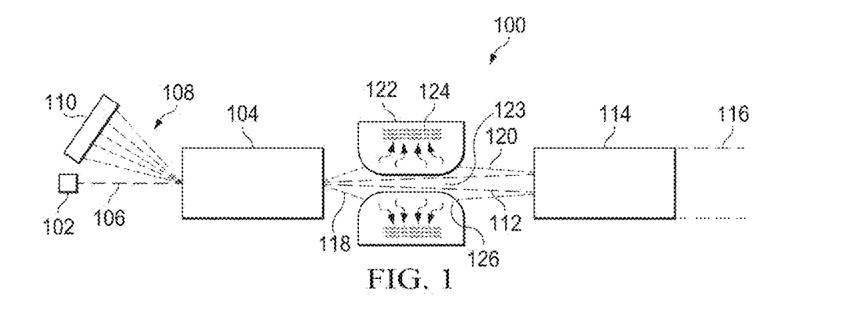
FIG. 1 illustrates an example laser system with a heat exchanger having a tapered light scraper according to this disclosure.

FIG. 1 illustrates an example laser system 100 with a heat exchanger having a tapered light scraper according to this disclosure. As shown in FIG. 1, the laser system 100 includes a master oscillator 102 and a power amplifier 104. The laser system 100 therefore has a master oscillator/power amplifier (MOPA) configuration.

The master oscillator 102 generally operates to generate low-power optical signals 106. The low-power optical signals 106 could denote any suitable optical signals having relatively low power. For example, the low-power optical signals 106 could include optical signals having a continuous wave (CW) output, a continuous pulse train (CPT), a pulse burst, or any of various other waveforms. The master oscillator 102 includes any suitable structure(s) for generating one or more low-power optical signals. In some embodiments, the master oscillator 102 includes a fiber laser.

The power amplifier 104 receives the low-power optical signals 106 from the master oscillator 102 and pump power 108 from one or more pump sources 110. The power amplifier 104 generally operates to amplify the low-power optical signals 106 and generate high-power optical signals 112. For example, the power amplifier 104 could amplify a low-power CW or other optical signal into a high-power CW or other optical signal having ten kilowatts of power or more. The received pump power 108 provides the necessary population inversion in the power amplifier's gain medium for this amplification.

The power amplifier 104 includes any suitable structure for amplifying optical signals. In some embodiments, the power amplifier 104 includes at least one planar waveguide as its gain medium. Each pump source 110 includes any suitable structure for generating optical power used by a power amplifier for amplification. In some embodiments, each pump source 110 includes one or more laser diodes, such as one or more laser diode arrays, or other light sources.

The high-power optical signals 112 are provided to an output expander and collimator 114, which produces a high-power output beam 116. The output expander and collimator 114 includes any suitable structure(s) for expanding and collimating optical signals, such as one or more optical devices like mirrors and lenses. However, any other or additional modifications could be made to the high-power optical signals 112 to generate the high-power output beam 116.

As noted above, stray electro-optical radiation is typically present to some extent in laser systems. For example, first stray radiation 118 in FIG. 1 could be caused by fluorescence or amplified spontaneous emissions (ASE) within the power amplifier 104. As a particular example, the high-power optical signals 112 may be emitted from the power amplifier 104 with a half-angle of 3°, whereas fluorescence may be emitted from the power amplifier 104 with a half-angle of 35°. As another example, back-reflections or scatter 120 could occur upon entry of the optical signals 112 into the output expander and collimator 114 or be created within the output expander and collimator 114 itself (such as from mirror or lens surfaces). Left unchecked, this stray radiation can strike other components in the laser system 100, heating those components and causing various problems (including those discussed above).

In some conventional approaches, reflective devices can be used to reflect stray radiation from certain components of a laser system. While this protects those components, the stray radiation is still reflected onto other components. As the power of laser systems increases, this becomes unacceptable since the power of the stray radiation similarly increases. Other conventional approaches pass an optical beam into a thru-hole of a structure, where the structure allows the bulk of the optical beam to pass and absorbs the stray radiation. However, the structure typically develops hot spots due to the stray radiation, particularly in corners of the structure, and those hot spots can be difficult to cool. Still other conventional techniques utilize absorbing aperture plates and light diffractors. Unfortunately, these techniques tend to break down or are unsuitable for use at high laser powers.

In accordance with this disclosure, at least one light-scraping heat exchanger 122 is provided in the laser system 100. The heat exchanger 122 includes a passage 123 through which an optical beam (such as the high-power optical signals 112) can pass. The heat exchanger 122 also absorbs stray radiation (such as the stray radiation 118 and the stray radiation 120) so that the stray radiation cannot damage other components of the laser system 100 or otherwise interfere with operation of the laser system 100.

As shown in FIG. 1 and as described in more detail below, the heat exchanger 122 includes one or more cooling channels 124 through which a coolant (such as a fluid like gas or liquid) can flow through the heat exchanger 122. The coolant absorbs heat from the heat exchanger 122 and transports the heat out of the laser system 100. Each cooling channel 124 could have any suitable size, shape, and dimensions, and any number of cooling channels 124 could be used with the heat exchanger 122. Also, any suitable coolant could be used to transport heat away from the heat exchanger 122.

The heat exchanger 122 also includes one or more tapered edges 126, which denote one or more edges where one or more interior surfaces of the heat exchanger 122 (such as one or more surfaces within the passage 123) meet with one or more outer surfaces of the heat exchanger 122. The tapered edges 126 include reflective surfaces and in this example are located around input and output apertures formed by the passage 123 through the heat exchanger 122. The tapered edges 126 reflect stray radiation into the passage 123, where the stray radiation is substantially absorbed by one or more absorptive surfaces within the passage 123. The absorbed stray radiation is converted into thermal energy, most or all of which is absorbed by the coolant flowing through the cooling channels 124. Ideally, the stray radiation is reflected by the tapered edges 126 so that the stray radiation is absorbed by the heat exchanger 122 near the locations of the cooling channels 124 in order to facilitate easier rejection of the thermal energy from the laser system 100.

By using a heat exchanger 122 with tapered edges 126, the amount of stray radiation is substantially reduced in the laser system 100, which helps to protect other components of the laser system 100 and ensure proper operation of the laser system 100. Also, the tapered edges 126 of the heat exchanger 122 help to diffuse the stray radiation so that the heat exchanger 122 is far less likely to develop hot spots that cannot be effectively cooled. Moreover, the heat exchanger 122 here represents a single component that can scrape, diffuse, absorb, and reject stray energy in the laser system 100. Performing all of these functions using a single component can help to reduce the size, weight, cost, and complexity of the laser system 100. In addition, the design of the heat exchanger 122 can help to reduce or minimize the number of "bounces" that stray radiation experiences within the laser system 100.

The heat exchanger 122 could be formed from any suitable material(s), such as when the body of the heat exchanger 122 is formed from one or more metals like an aluminum alloy or a copper alloy. The heat exchanger 122 could also be formed in any suitable manner, such as by using one or any combination of casting, machining, etching, brazing, friction welding, and diffusion bonding. The tapered edges 126 of the heat exchanger 122 could denote reflective surfaces, layers, or coatings, such as gold. The tapered edges 126 could also be formed in any suitable manner, such as by machining the body of the heat exchanger 122 and depositing reflective material onto the body.

Although FIG. 1 illustrates one example of a laser system 100 with a heat exchanger having a tapered light scraper, various changes may be made to FIG. 1. For example, the sizes, shapes, and relative dimensions of the various components in FIG. 1 are for illustration only. Also, the specific arrangement of components in FIG. 1 could vary as needed or desired. In addition, FIG. 1 illustrates one example environment in which a light-scraping heat exchanger could be used. The light-scraping heat exchangers described in this patent document could find use in any other suitable system.

Figure 2A:
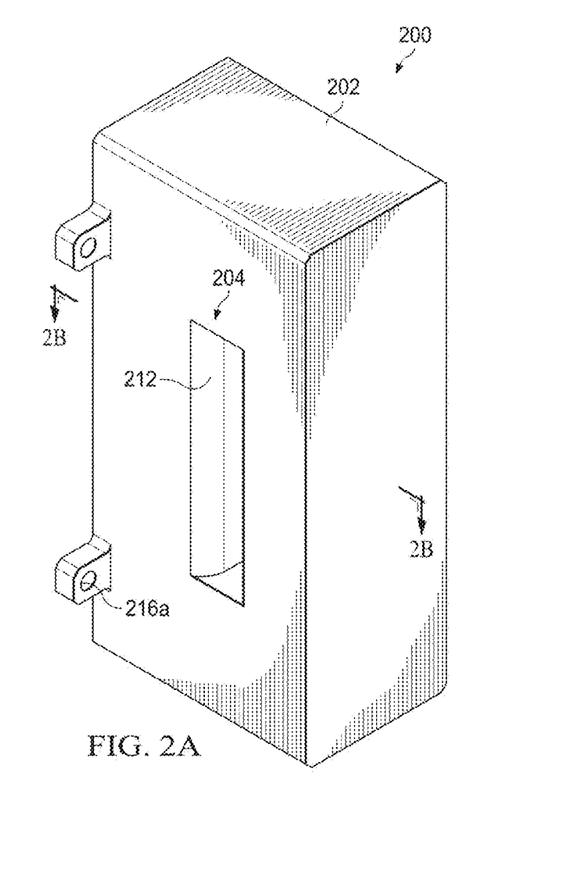
FIGS. 2A through 2D illustrate a first example heat exchanger with a tapered light scraper according to this disclosure.
Figure 2B:
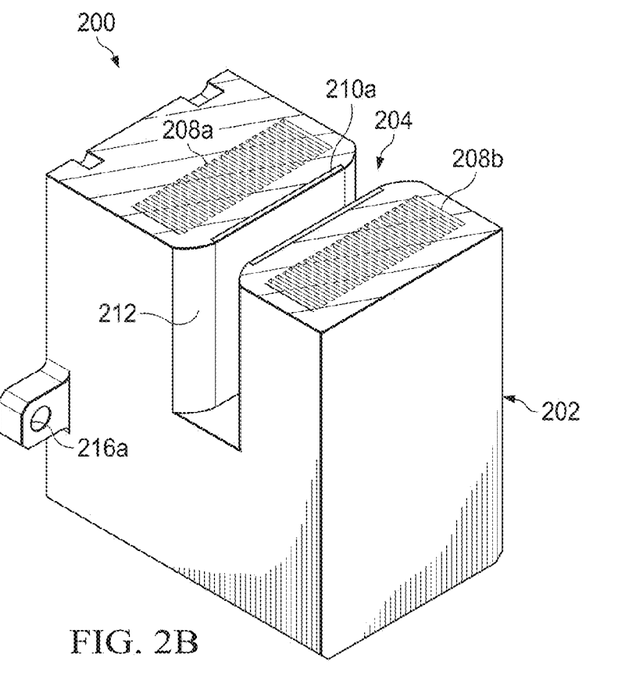
Figure 2C:
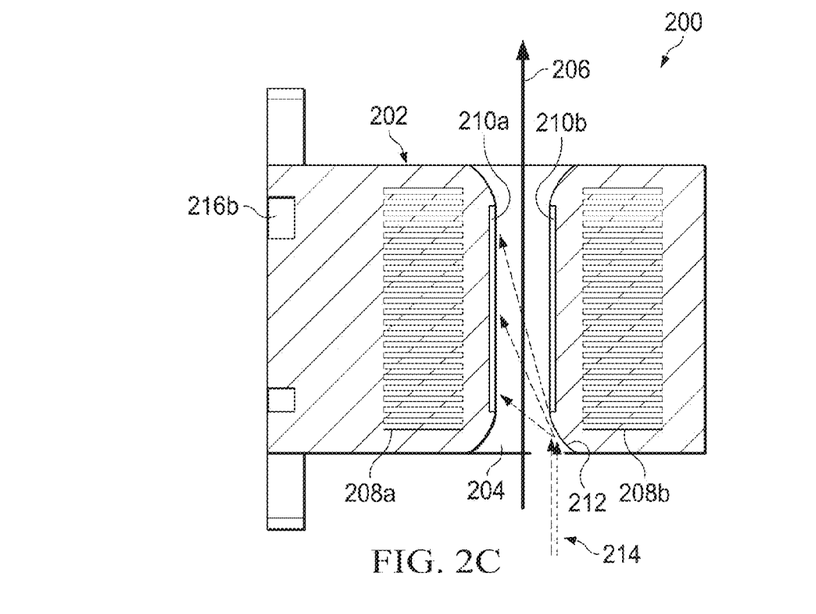
Figure 2D:
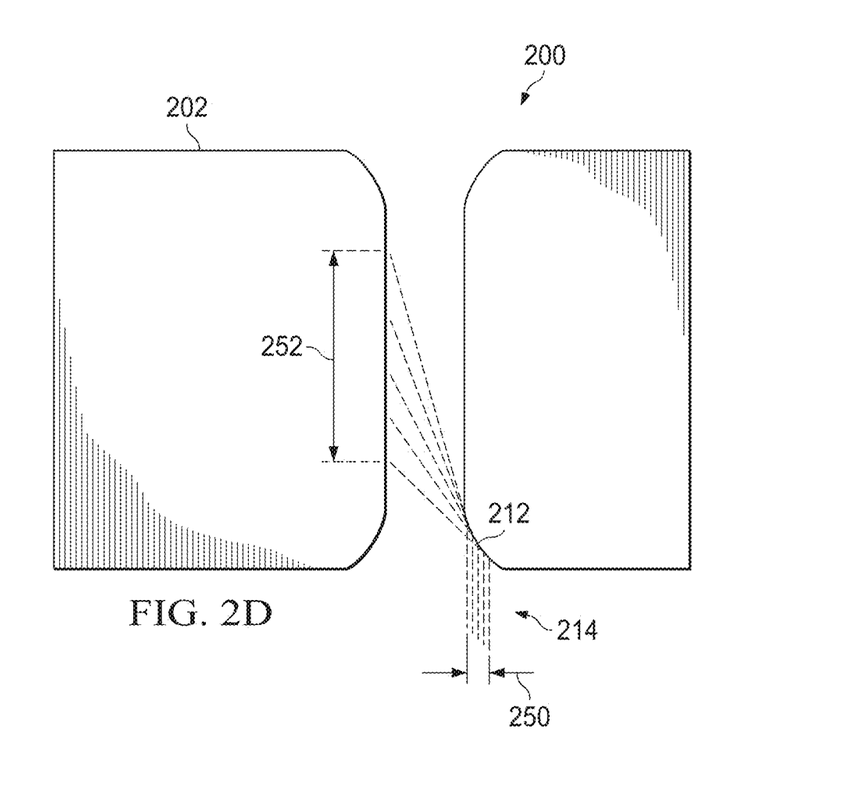

FIGS. 2A through 2D illustrate a first example heat exchanger 200 with a tapered light scraper according to this disclosure. In particular, FIG. 2A illustrates the heat exchanger 200, FIG. 2B illustrates a cross-section of the heat exchanger 200 along dashed line 2B in FIG. 2A, FIG. 2C illustrates a top view of the cross-section from FIG. 2B, and FIG. 2D illustrates an example use of the heat exchanger 200. The heat exchanger 200 shown in FIGS. 2A through 2D could, for example, denote the heat exchanger 122 in FIG. 1.

As shown in FIGS. 2A through 2C, the heat exchanger 200 includes a main body 202, which forms the bulk of the heat exchanger 200. As noted above, the body 202 could be formed from one or more metals like an aluminum alloy or a copper alloy. However, the body 202 may be formed of any material that provides suitable heat flux reduction.

A passage 204 extends through the body 202, which allows optical signals 206 to pass through the body 202. The passage 204 denotes any suitable path for optical signals through the body 202. In this example, the passage 204 has substantially flat interior surfaces that are substantially parallel to each other, and the passage 204 opens to two different sides of the body 202. This example passage 204 is for illustration only. The passage 204 could have any other suitable size, shape, and dimensions. The passage 204 could also open to two or more sides of the body 202.

One or more cooling channels 208a-208b are formed in the body 202. The cooling channels 208a-208b allow coolant to flow through the body 202 in order to remove thermal energy from the heat exchanger 200. In this example, the cooling channels 208a-208b have a generally rectangular cross-section, although each cooling channel 208a-208b could have any suitable size, shape, and dimensions. Also, the cooling channels 208a-208b here are arranged to be close to the passage 204, allowing coolant in the cooling channels 208a-208b to quickly absorb thermal energy that is being absorbed by the body 202. In this particular example, the rectangular cross-section of the cooling channels 208a-208b extends in a direction substantially parallel to the passage 204, which allows the cooling channels 208a-208b to extract heat along a substantial portion of the passage 204.

In this example, the cooling channels 208a-208b are shown as being patterned in some way. This indicates that the cooling channels 208a-208b could include fins, pins, or other structures that extend into the cooling channels 208a-208b in order to increase the surface area that is contacted by the coolant. Any suitable structures or patterning could be used in the cooling channels 208a-208b, and the structures or patterning could be formed in any suitable manner.

The passage 204 in the heat exchanger 200 includes one or more absorptive surfaces 210a-210b. The absorptive surfaces 210a-210b denote portions of the heat exchanger 200 that are designed to absorb stray radiation. The absorptive surfaces 210a-210b could be formed in various ways. For instance, the absorptive surfaces 210a-210b could denote oxidized or black anodized portions of the body 202 or other oxidized or black anodized material(s). The absorptive surfaces 210a-210b could also denote one or more absorptive materials deposited onto the surfaces of the body 202 that form the passage 204, such as black chrome. The absorptive surfaces 210a-210b could further denote surface features that are etched into or otherwise formed in or on the body 202 to help absorb radiation.

Various tapered edges 212 are formed in the body 202. The tapered edges 212 denote edges where interior surfaces of the heat exchanger 200 meet with outer surfaces of the heat exchanger 200. The tapered edges 212 are located around the apertures formed by the passage 204 and denote reflective surfaces of the body 202, such as those formed by depositing one or more metals like gold or other reflective material(s) onto the body 202. The tapered edges 212 could denote straight, curved, conic section, or other surfaces that help to reflect stray radiation inward into the passage 204. The exact geometry or geometries of the tapered edges 212 could vary as needed or desired. The general purpose of the tapered edges 212 is to reflect stray radiation inward into the passage 204, ideally in a manner that diffuses the stray radiation to thereby expand the surface area of the body 202 being struck by the stray radiation. This helps to reduce the heat flux of the stray radiation on the body 202 to the point where the heat flux can be effectively converted into heat and removed from the body 202.

An example operation of the tapered edges 212 is illustrated in FIG. 2C, where incoming stray radiation 214 is reflected off one of the tapered edges 212. The bottom right tapered edge 212 reflects the incoming stray radiation 214 into the passage 204 and towards the absorptive surface 210a. The bottom left tapered edge 212 could similarly reflect incoming stray radiation into the passage 204 and towards the absorptive surface 210b. The top tapered edges 212 could similarly reflect incoming stray radiation into the passage 204 and towards the absorptive surfaces 210a-210b.

Note that while there are four tapered edges shown here on opposite sides of the body 202, the body 202 could include one or more tapered edges on only one side of the body 202. This may be useful, for example, when stray radiation would typically reach one side of the heat exchanger 200 but not the other.

The heat exchanger 200 may optionally include one or more connection points 216a-216b, which can be used to couple or secure the heat exchanger 200 to a package or platform. Any suitable connection mechanism or mechanisms could be used with the heat exchanger 200, such as bolts, screws, or pins. The type(s) and arrangement(s) of the connection points 216a-216b can vary in a number of ways based on how the heat exchanger 200 is to be installed. In this particular example, the connection points 216a can receive bolts or screws, while the connection points 216b can receive alignment pins.

An example of the diffusion of stray radiation 214 by the heat exchanger 200 is shown in FIG. 2D. As can be seen in FIG. 2D, the stray radiation 214 has a smaller width 250 prior to striking and reflecting off the tapered edge 212. Without the tapering of the edge, substantially all of the stray radiation 214 could be absorbed within a much smaller area of the heat exchanger 200. This could rapidly increase the temperature of that portion of the heat exchanger 200 and actually damage the heat exchanger 200. By tapering the edges 212, the stray radiation 214 is reflected and diffused so that a width 252 of the stray radiation 214 striking the heat exchanger 200 is much larger than the width 250. For example, the width 252 could be ten to twenty times larger than the width 250, although other ratios could also be used.

The diffusion of the stray radiation 214 helps to reduce the heat flux striking any specific portion of the heat exchanger 200. This results in lower temperatures in the heat exchanger 200, which mitigates thermal blooming in the laser path and reduces or eliminates boiling of the coolant. The ratio for the diffused radiation can be dependent on various factors (such as the design of the tapering) to maintain acceptable heat exchanger and coolant temperatures.

Figure 3A:
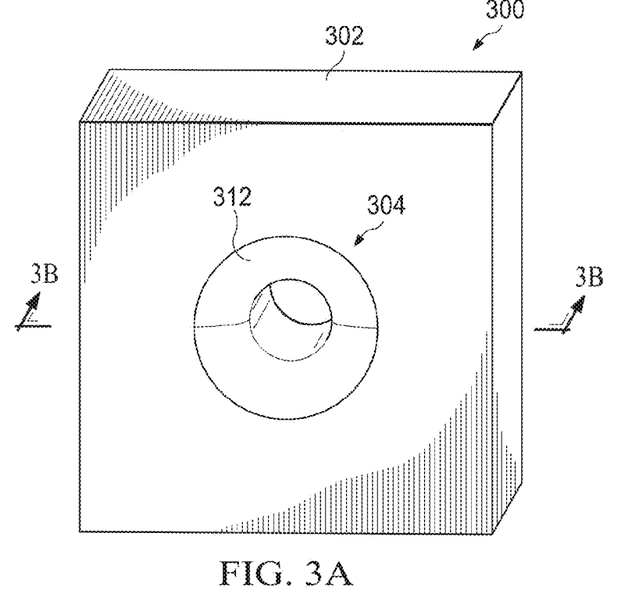
FIGS. 3A and 3B illustrate a second example heat exchanger with a tapered light scraper according to this disclosure.
Figure 3B:
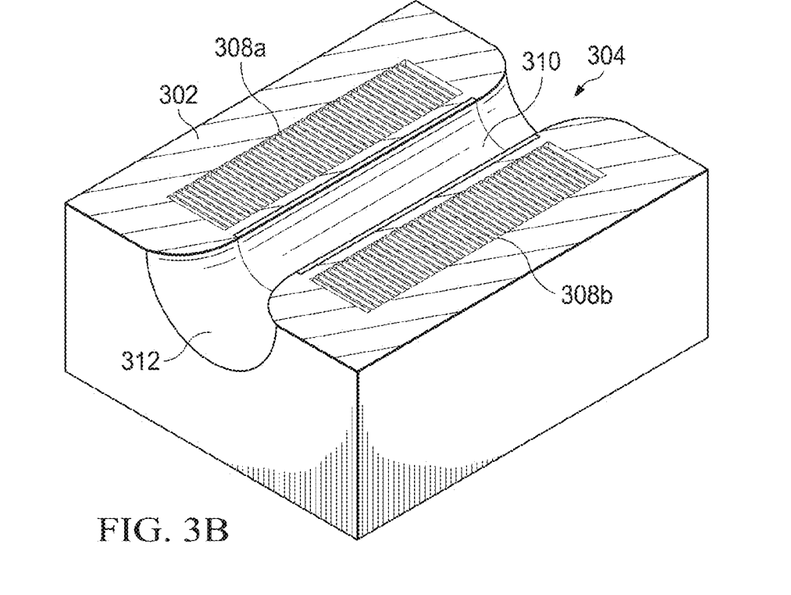

While FIGS. 2A through 2D illustrate a first example passage 204 through a heat exchanger 200, other implementations could also be used. For example, FIGS. 3A and 3B illustrate a second example heat exchanger 300 with a tapered light scraper according to this disclosure. In particular, FIG. 3A illustrates the heat exchanger 300, and FIG. 3B illustrates a cross-section of the heat exchanger 300 along line 3B of FIG. 3A. The heat exchanger 300 shown in FIGS. 3A and 3B could, for example, denote the heat exchanger 122 in FIG. 1.

As shown in FIGS. 3A and 3B, the heat exchanger 300 includes a body 302 having a passage 304 extending through the body 302. The passage 304 allows optical signals to pass through the body 302. In this example, the passage 304 is generally cylindrical, has a single curved interior surface, and defines substantially circular apertures on opposite sides of the body 302. The body 302 also includes one or more cooling channels 308a-308b, which could denote different cooling channels or a single arced or annular cooling channel. The one or more cooling channels 308a-308b allow coolant to flow through the body 302 and remove heat from the heat exchanger 300.

The passage 304 in the heat exchanger 300 includes at least one absorptive surface 310. The absorptive surface 310 is designed to absorb stray radiation and can be formed around most or all of the interior surface of the passage 304. The absorptive surface 310 could denote oxidized or black anodized portions of the body 302 or other oxidized or black anodized material(s), one or more absorptive materials deposited onto the surfaces of the body 302 like black chrome, or surface features that are etched into or otherwise formed in or on the body 302 to help absorb radiation.

At least one tapered edge 312 is formed in the body 302. The tapered edges 312 denote edges where one or more interior surfaces of the heat exchanger 300 meet with one or more outer surfaces of the heat exchanger 300. The tapered edges 312 are located around the apertures formed by the passage 304 and denote reflective surfaces of the body 302, such as those formed by depositing one or more metals like gold or other reflective material(s) onto the body 302. The tapered edges 312 could denote straight, curved, conic section, or other surfaces that help to reflect stray radiation inward into the passage 304. The exact geometry or geometries of the tapered edges 312 could vary as needed or desired. In this example, each tapered edge 312 could surround most or all of an aperture formed by the passage 304, and one or multiple tapered edges 312 could be used on one or multiple sides of the body 302.

As with the heat exchanger 200, the tapered edge(s) 312 of the heat exchanger 300 can help to scrape and diffuse stray radiation, such as stray radiation in the laser system 100. The absorptive surface(s) 310 of the heat exchanger 300 can then absorb the diffused stray radiation, converting the stray radiation into heat that is removed via the cooling channel(s) 308a-308b.

Although FIGS. 2A through 3B illustrate examples of heat exchangers 200, 300 with tapered light scrapers, various changes may be made to FIGS. 2A through 3B. For example, the sizes, shapes, and relative dimensions of the various components in each figure are for illustration only. Also, heat exchangers having different body, passage, and cooling channel designs could be used, and the apertures defined by the passages through the heat exchangers could have any suitable design.

Figure 4A:
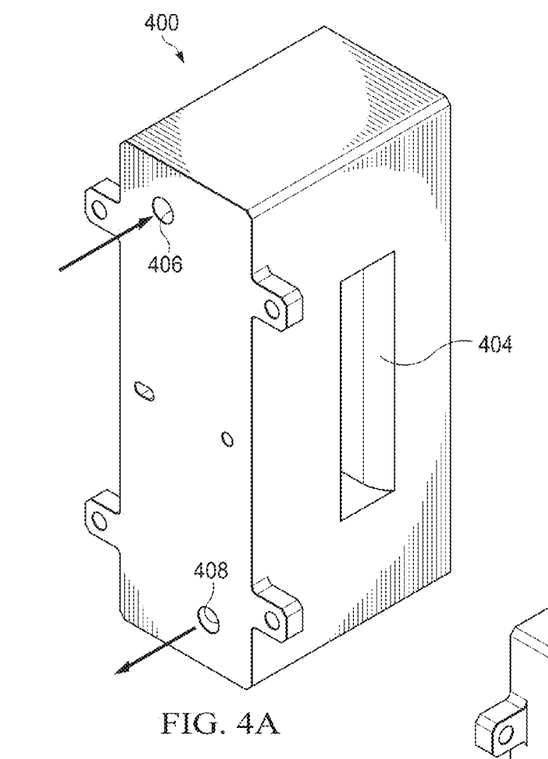
FIGS. 4A and 4B illustrate an example distribution of coolant in a heat exchanger with a tapered light scraper according to this disclosure.
Figure 4B:
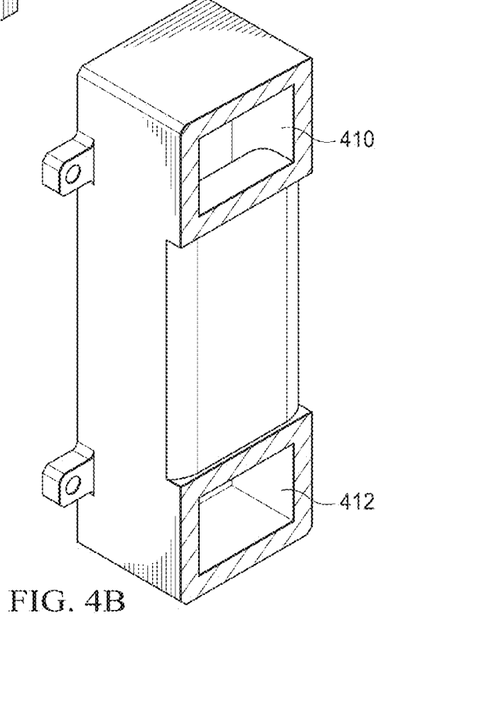

FIGS. 4A and 4B illustrate an example distribution of coolant in a heat exchanger 400 with a tapered light scraper according to this disclosure. In this example, the heat exchanger 400 includes a rectangular passage 404 similar to the heat exchanger 200, although the passage 404 could have any other suitable size, shape, and dimensions.

As shown in FIG. 4A, the heat exchanger 400 includes at least one input port 406 and at least one output port 408. The input port 406 receives incoming coolant prior to the coolant absorbing heat from the heat exchanger 400, and the output port 408 provides outgoing coolant after the coolant absorbs heat from the heat exchanger 400. Each input or output port 406-408 includes any suitable pathway for receiving coolant.

As shown in FIG. 4B, channels 410 and 412 connect the cooling channels on opposite sides of the passage 404. Coolant received through the input port 406 can be provided to the cooling channels on opposite sides of the passage 404, and coolant is provided from the cooling channels on opposite sides of the passage 404 to the output port 408. The channels 410 and 412 support this coolant flow through the multiple cooling channels. Each channel 410 and 412 can have any suitable size, shape, and dimensions and support any suitable coolant flow.

Although FIGS. 4A and 4B illustrate one example of the distribution of coolant in a heat exchanger 400 with a tapered light scraper, various changes may be made to FIGS. 4A and 4B. For example, the sizes, shapes, and relative dimensions of the various components in FIGS. 4A and 4B are for illustration only.

Figure 5:
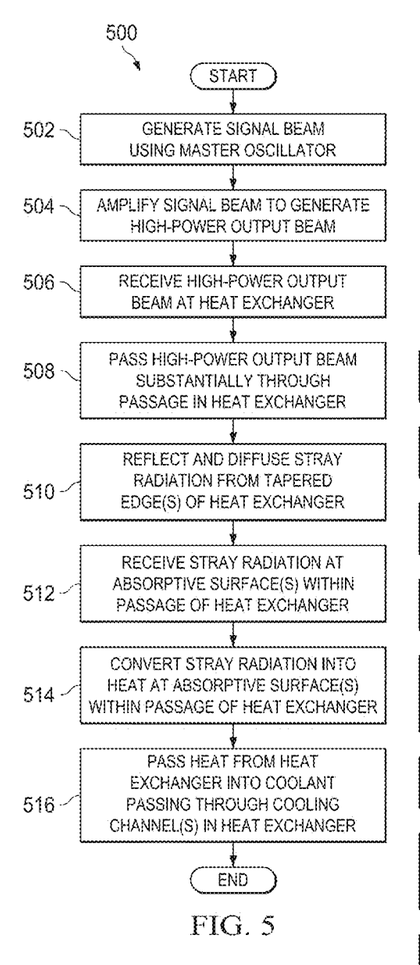
FIG. 5 illustrates an example method for using a heat exchanger with a tapered light scraper in a laser system according to this disclosure.

FIG. 5 illustrates an example method 500 for using a heat exchanger with a tapered light scraper in a laser system according to this disclosure. For ease of explanation, the method 500 is described with respect to the heat exchangers 122, 200, 300, 400 operating in the system 100 of FIG. 1. However, the method 500 could be used by any suitable heat exchanger and in any suitable system.

As shown in FIG. 5, a signal beam is generated using a master oscillator at step 502, and the signal beam is amplified using a power amplifier to create a high-power output beam at step 504. This could include, for example, the master oscillator 102 generating a lower-power signal beam having the desired waveform. This could also include the power amplifier 104 amplifying the lower-power signal beam using pump power (such as from one or more pump sources 110) to generate the high-power output beam. Note, however, that any other suitable technique could be used to generate any other suitable laser output.

The high-power output beam is received at a heat exchanger at step 506 and passes substantially through a passage of the heat exchanger at step 508. This could include, for example, directing the high-power output beam to the heat exchanger 122, 200, 300, 400. This could also include allowing most or all of the high-power output beam to pass through the passage 123, 204, 304, 404 of the heat exchanger 122, 200, 300, 400.

Stray radiation is reflected from one or more tapered edges of the heat exchanger and diffused at step 510. This could include, for example, reflecting fluorescence, ASE, or other stray radiation from the tapered edge(s) 126, 212, 312 of the heat exchanger 122, 200, 300, 400. This could also include the tapered edge(s) 126, 212, 312 reflecting the stray radiation inward into the passage 123, 204, 304 of the heat exchanger 122, 200, 300, 400. Due to the tapering of the tapered edge(s) 126, 212, 312, the reflected radiation expands or diffuses.

The stray radiation is absorbed by one or more absorptive surfaces within the passage of the heat exchanger at step 512. This could include, for example, the fluorescence, ASE, or other stray radiation striking the absorptive surfaces 210a-210b, 310 within the passage 123, 204, 304 of the heat exchanger 122, 200, 300, 400. The stray radiation is converted into heat at the one or more absorptive surfaces of the heat exchanger at step 514. However, because the radiation has been diffused, the stray radiation results in lower temperatures in the heat exchanger 122, 200, 300, 400.

At least some of the generated heat is transferred from the heat exchanger into coolant flowing through one or more cooling channels of the heat exchanger at step 516. This could include, for example, the generated heat passing from the heat exchanger 122, 200, 300, 400 into coolant flowing through the cooling channels 124, 208a-208b, 308a-308b, 410-412.

In this way, the heat exchanger 122, 200, 300, 400 is able to scrape, diffuse, absorb, and reject stray energy within a laser system. The heat exchanger 122, 200, 300, 400 can accomplish this more efficiently and at lower temperatures, which helps to reduce or minimize the risk of damage to the laser system by the stray radiation.

Although FIG. 5 illustrates one example of a method 500 for using a heat exchanger with a tapered light scraper in a laser system, various changes may be made to FIG. 5. For example, while shown as a series of steps, various steps in FIG. 5 could overlap, occur in parallel, occur in a different order, or occur any number of times.

Figure 6A:
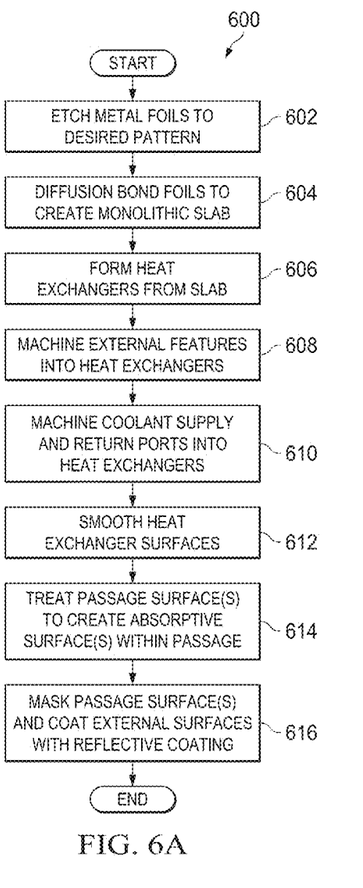
FIGS. 6A and 6B illustrate a first example method for forming a heat exchanger with a tapered light scraper according to this disclosure.
Figure 6B:
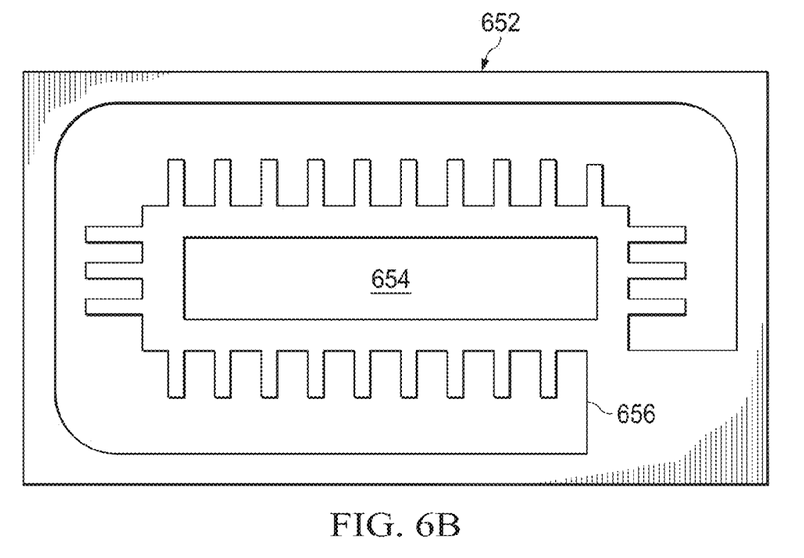

FIGS. 6A and 6B illustrate a first example method 600 for forming a heat exchanger with a tapered light scraper according to this disclosure. For ease of explanation, the method 600 is described with respect to the heat exchangers 122, 200, 300, 400. However, the method 600 could be used to form any other suitable heat exchanger.

As shown in FIG. 6A, multiple metal foils are etched to a desired pattern at step 602. FIG. 6B shows one example of a metal foil etch pattern 652 in which one portion 654 defines a passage for optical signals through a heat exchanger and another portion 656 defines cooling channels within the heat exchanger. The metal foils could be formed from any suitable materials, such as an aluminum alloy or a copper alloy, and in any suitable manner.

The metal foils are diffusion bonded or otherwise bonded to form a monolithic slab at step 604, and multiple heat exchangers are formed from the slab at step 606. This could include, for example, using wire electrical discharge machining (EDM) to separate individual instances of the heat exchangers within the slab after the diffusion bonding process. External features are machined into each heat exchanger at step 608, and coolant supply and return ports are machined into each heat exchanger at step 610. The external features could include features such as the tapered edges 126, 212, 312 and the connection points 216a-216b of the heat exchangers. Any suitable machining technique could be used here, and any other or additional external features could be formed.

The heat exchanger surfaces are smoothed at step 612, such as via polishing. The passages of the heat exchangers are treated to form one or more absorptive surfaces in the passages at step 614. This could include, for example, placing at least one absorptive coating within each passage, oxidizing or anodizing at least one portion within each passage, or depositing oxidized, anodized, black chrome, or other material(s) within each passage. At least the passage surfaces are masked and a reflective coating is applied to each heat exchanger at step 616. This could include, for example, depositing a gold coating or other reflective material(s) onto at least the tapered edge(s) 126, 212, 312 of each heat exchanger. At this point, any mask can be removed, and the heat exchangers can be further processed or used.

Figure 7A:
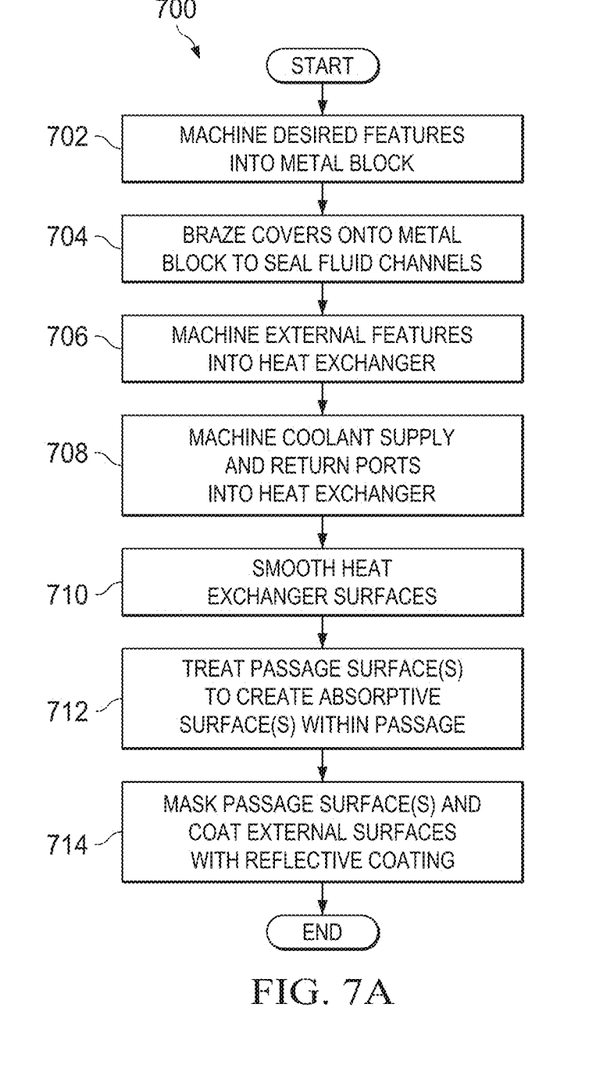
FIGS. 7A and 7B illustrate a second example method for forming a heat exchanger with a tapered light scraper according to this disclosure.
Figure 7B:
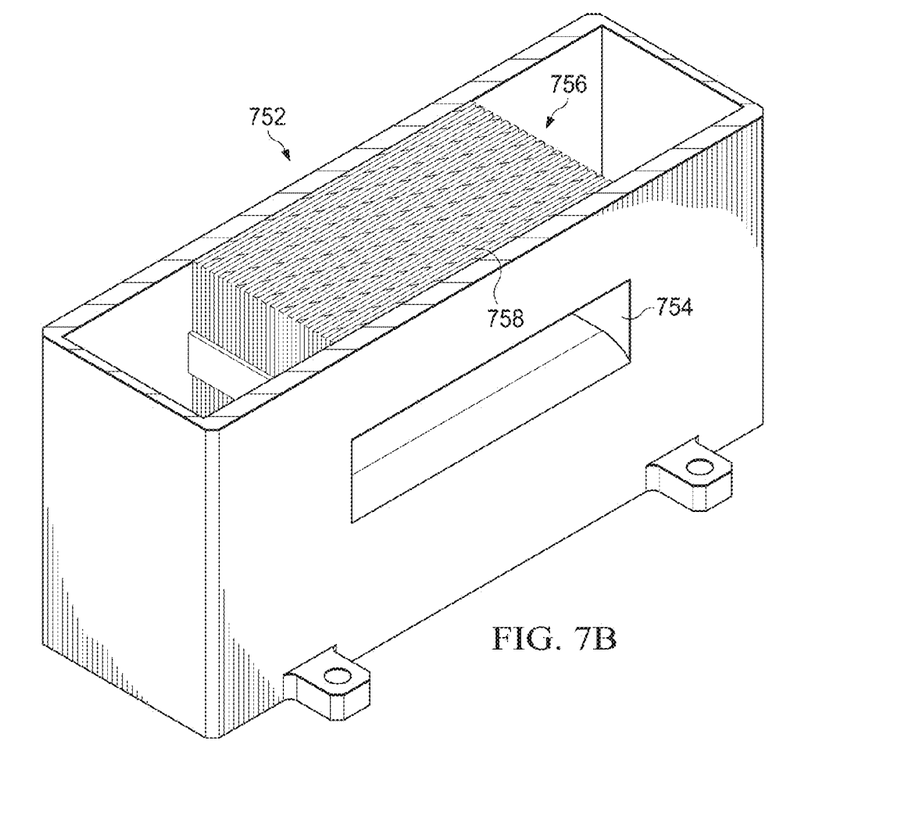

FIGS. 7A and 7B illustrate a second example method 700 for forming a heat exchanger with a tapered light scraper according to this disclosure. For ease of explanation, the method 700 is described with respect to the heat exchangers 122, 200, 300, 400. However, the method 700 could be used to form any other suitable heat exchanger.

As shown in FIG. 7A, desired features are machined into a block of metal at step 702, and one or more covers are brazed onto the block at step 704. FIG. 7B shows one example of a metal block 752 having a passage 754, cooling channels 756, and cooling channels 758 formed in the block 752. The block could be formed from any suitable materials, such as an aluminum alloy or a copper alloy, and machined in any suitable manner. Brazing one or more covers onto the block 752 can seal the cooling channels within the resulting structure.

External features are machined into the heat exchanger at step 706, and coolant supply and return ports are machined into the heat exchanger at step 708. The external features could include features such as the tapered edges 126, 212, 312 and the connection points 216a-216b of the heat exchanger. Any suitable machining technique could be used here, and any other or additional external features could be formed.

The heat exchanger surfaces are smoothed at step 710, such as via polishing. The passage of the heat exchanger is treated to form one or more absorptive surfaces in the passage at step 712. This could include, for example, placing at least one absorptive coating within the passage, oxidizing or anodizing at least one portion within the passage, or depositing oxidized, anodized, black chrome, or other material(s) within each passage. At least the passage surfaces are masked and a reflective coating is applied to the heat exchanger at step 714. This could include, for example, depositing a gold coating or other reflective material(s) onto at least the tapered edge(s) 126, 212, 312 of the heat exchanger. At this point, any mask can be removed, and the heat exchanger can be further processed or used.

Although FIGS. 6A through 7B illustrate examples of method for forming a heat exchanger with a tapered light scraper, various changes may be made to FIGS. 6A through 7B. For example, while shown as a series of steps, various steps in FIGS. 6A and 7A could overlap, occur in parallel, occur in a different order, or occur any number of times. Also, the structures of the metal foil etch pattern 652 and the metal block 752 in FIGS. 6B and 7B are examples only.

High-power laser systems, such as the ones described above, could be used in a large number of military and commercial applications. The following discussion provides a description of various example commercial applications. However, the following discussion does not limit this disclosure to any particular applications.

High-power laser systems could find use in commercial mining applications, such as in drilling, mining, or coring operations. For instance, high-power laser systems could be used to soften or weaken an earth bed prior to drilling through the earth bed using drill bits. This could allow for fewer drill bit changes and extended lifetimes and reliabilities of the drill bits. Here, free-space propagation of a high-power laser beam from an output window of a laser system could be used, allowing deeper penetration at further distances compared to conventional fiber lasers.

High-power and high-beam quality laser systems could also find use in remote laser welding, cutting, drilling, or heat treating operations, such as in industrial or other automation settings. The use of a high-power and high-beam quality laser system allows the processing of thicker materials to occur at larger working distances from the laser system while minimizing the heat-affected zone and maintaining vertical or other cut lines. Among other things, this helps to support welding or cutting operations where proximity to the weld or cut site is difficult or hazardous. It also helps to protect the laser system and possibly any human operators from smoke, debris, or other harmful materials.

High-power laser systems could further find use in construction and demolition operations. Example operations could include metal resurfacing or deslagging, paint removal, and industrial demolition operations. High-power laser systems can be used to ablate material much faster and safer compared to conventional operations. As a particular example of this functionality, high-power laser systems could be used to support demolition of nuclear reactors or other hazardous structures. Here, the high-power laser systems could be used to cut through contaminated structures like contaminated concrete or nuclear containment vessels or reactors from long distances. This helps to avoid the use of water jet cutting or other techniques that create hazardous waste, such as contaminated water. It also provides improved safety since human operators can remain farther away from contaminated structures being demolished.

A number of additional applications are possible. For example, high-power laser systems could find use in power beaming applications, where high-power laser beams are targeted to photovoltaic (solar) cells of remote devices to be recharged. High-power laser systems could find use in hazardous material (HAZMAT) applications, where the laser systems are used to heat and decompose hazardous materials into less harmful or non-harmful materials.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 25 U.S.C. §112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 25 U.S.C. §112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a heat exchanger comprising:
a body having a passage through the body, the passage defining apertures on multiple sides of the body, the passage configured to allow optical signals to pass through the body;
one or more tapered edges at least partially around one or more of the apertures, each tapered edge configured to reflect optical radiation inward into the passage; and
one or more absorptive surfaces within the passage, the one or more absorptive surfaces configured to absorb the reflected optical radiation;
the heat exchanger configured to convert the absorbed optical radiation into heat;
the body further comprising one or more cooling channels configured to receive coolant that absorbs the heat.

2. The apparatus of claim 1, wherein:
the body comprises multiple substantially flat interior surfaces defining the passage and multiple absorptive surfaces;
the interior surfaces are substantially parallel to one another; and
each interior surface has one of the absorptive surfaces.

3. The apparatus of claim 1, wherein:
the body comprises a substantially cylindrical passage with a curved interior surface; and
the interior surface has the one or more absorptive surfaces.

4. The apparatus of claim 1, wherein:
the passage includes one or more interior surfaces; and
each tapered edge connects at least one of the one or more interior surfaces with at least one outer surface of the body.

5. The apparatus of claim 1, wherein each of multiple absorptive surfaces is adjacent to one of multiple cooling channels.

6. The apparatus of claim 1, wherein:
the body comprises one or more metals; and
each tapered edge comprises one or more reflective materials on the body.

7. The apparatus of claim 6, wherein:
the body comprises an aluminum alloy or a copper alloy; and
each tapered edge comprises a gold-coated surface.

8. The apparatus of claim 1, wherein each tapered edge is further configured to diffuse the reflected optical radiation so that a width of the optical radiation received at the tapered edge is smaller than a width of the reflected optical radiation received at one of the one or more absorptive surfaces.

9. The apparatus of claim 1, wherein each tapered edge comprises a straight surface, a curved surface, or a conic section.

10. A system comprising:
a laser gain medium configured to amplify optical signals; and
a heat exchanger comprising:
a body having a passage through the body, the passage defining apertures on multiple sides of the body, the passage configured to allow the amplified optical signals to pass through the body;
one or more tapered edges at least partially around one or more of the apertures, each tapered edge configured to reflect optical radiation inward into the passage; and
one or more absorptive surfaces within the passage, the one or more absorptive surfaces configured to absorb the reflected optical radiation;
the heat exchanger configured to convert the absorbed optical radiation into heat;
the body further comprising one or more cooling channels configured to receive coolant that absorbs the heat.

11. The system of claim 10, wherein:
the body comprises multiple substantially flat interior surfaces defining the passage and multiple absorptive surfaces;
the interior surfaces are substantially parallel to one another; and
each interior surface has one of the absorptive surfaces.

12. The system of claim 10, wherein:
the body comprises a substantially cylindrical passage with a curved interior surface; and
the interior surface has the one or more absorptive surfaces.

13. The system of claim 10, wherein:
the passage includes one or more interior surfaces; and
each tapered edge connects at least one of the one or more interior surfaces with at least one outer surface of the body.

14. The system of claim 10, wherein each of multiple absorptive surfaces is adjacent to one of multiple cooling channels.

15. The system of claim 10, wherein each tapered edge is further configured to diffuse the reflected optical radiation so that a width of the optical radiation received at the tapered edge is smaller than a width of the reflected optical radiation received at one of the one or more absorptive surfaces.

16. The system of claim 10, wherein each tapered edge comprises a straight surface, a curved surface, or a conic section.

17. The system of claim 10, wherein the laser gain medium comprises a planar waveguide.

18. A method comprising:
passing optical signals into a passage through a body of a heat exchanger, the passage defining apertures on multiple sides of the body;
reflecting optical radiation inward into the passage using one or more tapered edges at least partially around one or more of the apertures;
absorbing the reflected optical radiation using one or more absorptive surfaces within the passage;
converting the absorbed optical radiation into heat; and
transferring the heat to coolant within one or more cooling channels of the heat exchanger.

19. The method of claim 18, wherein:
the body comprises multiple substantially flat interior surfaces defining the passage and multiple absorptive surfaces;
the interior surfaces are substantially parallel to one another; and
each interior surface has one of the absorptive surfaces.

20. The method of claim 18, wherein:
the body comprises a substantially cylindrical passage with a curved interior surface; and
the interior surface has the one or more absorptive surfaces.

21. The method of claim 18, further comprising:
diffusing the reflected optical radiation using the one or more tapered edges.

22. A method comprising:
obtaining a laser gain medium configured to output optical signals; and
inserting a heat exchanger into an optical path of the optical signals, the heat exchanger comprising:
a body having a passage through the body, the passage defining apertures on multiple sides of the body, the passage configured to allow the optical signals to pass through the body;
one or more tapered edges at least partially around one or more of the apertures, each tapered edge configured to reflect optical radiation inward into the passage; and
one or more absorptive surfaces within the passage, the one or more absorptive surfaces configured to absorb the reflected optical radiation;
the heat exchanger configured to convert the absorbed optical radiation into heat;
the body further comprising one or more cooling channels configured to receive coolant that absorbs the heat.

23. The method of claim 22, wherein:
the body comprises multiple substantially flat interior surfaces defining the passage and multiple absorptive surfaces;
the interior surfaces are substantially parallel to one another; and
each interior surface has one of the absorptive surfaces.

24. The method of claim 22, wherein:
the body comprises a substantially cylindrical passage with a curved interior surface; and
the interior surface has the one or more absorptive surfaces.

25. The method of claim 22, further comprising:
fabricating the heat exchanger using foils that are bonded together and processed to form the heat exchanger.

26. The method of claim 22, further comprising:
fabricating the heat exchanger by machining the passage and the one or more cooling channels into a block and processing the block to form the heat exchanger.

\* \* \* \* \*